Dec. 25, 1951   H. R. DAVIS ET AL   2,580,375
FLUE GAS CHILLING
Filed June 3, 1950
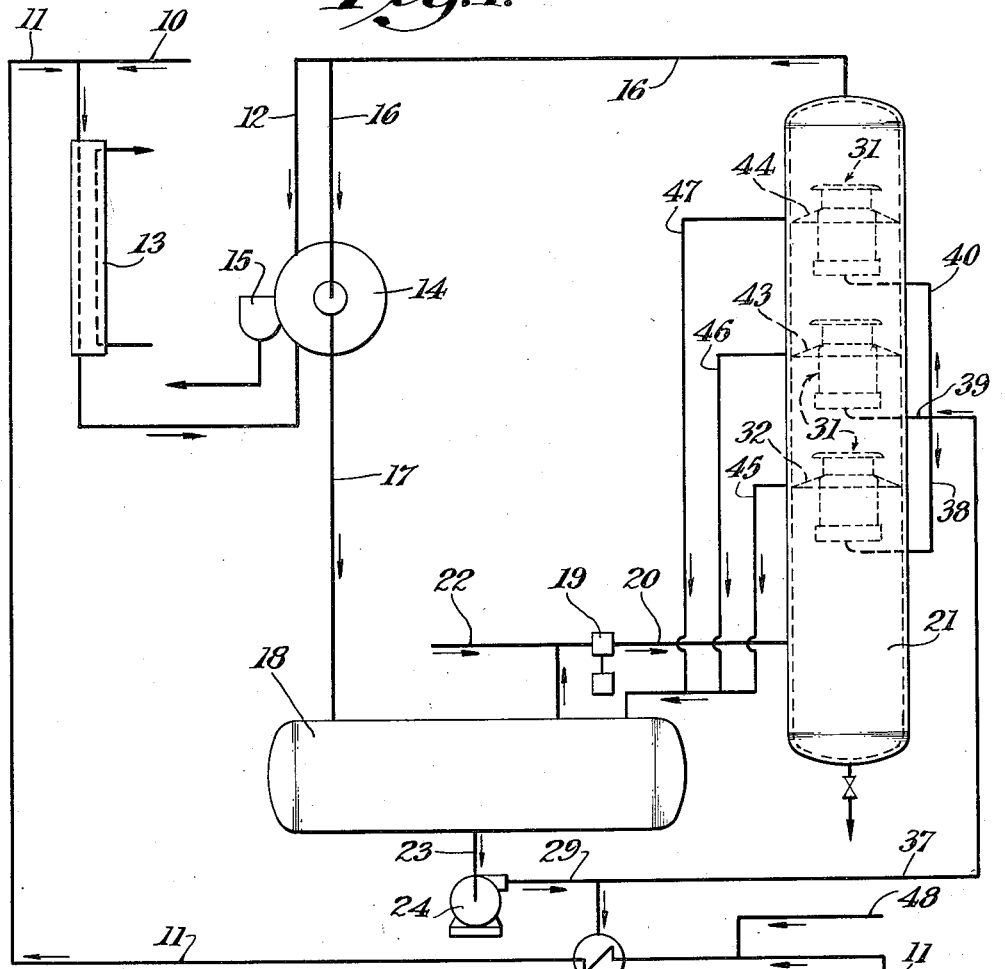
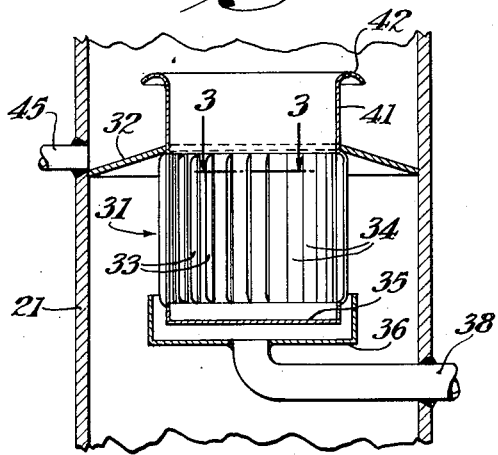
INVENTORS
*Hyman R. Davis &
Robert M. Santaniello*
BY *Nathaniel Ely*
ATTORNEY Patented Dec. 25, 1951

2,580,375

UNITED STATES PATENT OFFICE 2,580,375

FLUE GAS CHILLING

Hyman R. Davis, Jackson Heights, and Robert M. Santaniello, Brooklyn, N. Y., assignors to The Lummus Company, New York, N. Y., a corporation of Delaware Application June 3, 1950, Serial No. 165,914

3 Claims. (Cl. 196—19)

This invention relates to an improvement in a method and apparatus for cooling flue gas. It is particularly adapted to be employed in connection with a solvent dewaxing operation wherein flue gas is used as a blanketing medium during filtration.

Due to the explosive nature of the solvents employed in these solvent dewaxing operations, it is common practice to use a blanket of cooled inert gas in various locations and particularly in the filtration equipment. Dewaxing operations require large volumes of flue gas and much of this gas must be cooled to temperatures below 0° F. Accordingly, it is apparent that the problem of cooling this gas is one which is large in scope. Further complications are added by virtue of the fact that the gas to be cooled generally contains water which crystallizes out as ice. Present practice is to use alternate heat exchangers, one being used for cooling while others are in various stages of de-icing. This of course necessitates proportionately large amounts of equipment, special controls, and in addition results in operational difficulties.

The principal object of our invention is to provide an improved method and apparatus for the repeated chilling of flue gas by direct contact with solvent or solvent solutions wherein the temperature reduction is accomplished without the ice clogging formation.

A more specific object of our invention is to provide a method and means for the direct contacting of relatively cold solvent or pressed oil solution with flue gas in a vortex wherein highly intimate mixing and heat transfer are obtained and in which liquid is thrown out centrifugally.

Further objects and advantages of our invention will appear from the following description of a preferred form of embodiment thereof as described in the following specification and as illustrated in the attached drawing in which:

Fig. 1 is a schematic outline of our improved flue gas chilling system.

Fig. 2 is an enlarged substantially central vertical cross-section of the contacting unit.

Fig. 3 is an enlarged horizontal cross-section along lines 3—3 of Fig. 2.

In carrying out the invention, the wax-bearing oil from a suitable source indicated at 10 is mixed with a suitable solvent liquid from line 11. This solvent liquid may comprise a light petroleum fraction such as naphtha or other various organic liquids or mixtures thereof, including alcohols, ketones, aldehydes, cyclic hydrocarbons, benzol or its homologs, or derivatives of these various materials. The solvent in line 11 may preferably be acetone, benzol and toluol, or methyl-ethyl-ketone, benzol and toluol.

The mixture of oil to be dewaxed and the solvent liquids are cooled to the desired filtration temperature in heat exchanger 13 and are thence introduced into filter 14 which may be of the continuous rotating drum type or other type having a closed body. The filter provides a rotating filtration surface, not shown, which collects precipitated wax thereon. This wax is removed by suitable means and discharged into the wax discharge chamber 15.

Ordinarily the separated wax on the filter surface is vacuum dried and then washed by means of a spray of suitable washing liquid. The cake, after washing, is again dried by the passage of cold inert gas therethrough. The inert or flue gas enters the filter through lines 12 and 16 and the filtrate-solvent, oil, and wash liquid are generally indicated as being removed through line 17 although separate withdrawal conduits are customarily provided.

The liquid products removed from filter 14 through line 17 together with the inert gas contained therein, enter filtrate tank 18 in which there is a partial separation of liquid from vapor or gas. The saturated gas is removed by vacuum pump 19 and discharged through line 20 to cooling tower 21. In addition, fresh gas make-up may be introduced from line 22 such gas passing through vacuum pump 19 to cooling tower 21 along with the recycled gas.

Filtrate from which the gas has been separated is drawn off from tank 18 through line 23 by pump 24, a part of the solvent being suitably heated in heat exchanger 25 and thence passed to the solvent recovery system 26 through line 29. In this system the oil and water are separated from the dry solvent, the oil being drawn off at 27, the water at 28 and the dry solvent through line 11. The dry solvent may be returned through line 11 to constitute the original source of solvent for the initial oil mixture.

The solvent recovery system 26 is not intended to reflect any particular type of apparatus and it may include distillation columns or other apparatus designed to effect the desired degree of separation. Makeup solvent may be added through line 48.

The wet, compressed, warm gas in line 20, which may have a temperature of about 110° F., must, for proper operation of the filter 14, be cooled to below the freezing point of water and preferably below 0° F. In accordance with our invention we propose to use the apparatus generally shown in the application of Ward J. Bloomer, Serial No. 59,719, filed November 12, 1948, now Patent Number 2,560,072.

The particular apparatus for accomplishing the mixing is generally shown in Fig. 2 and consists of a hollow cylindrical tuyère 31 which is mounted in the deck 32. The tuyère consists of a wall, as for example sheet material having a series of blades 34 which are struck out from the wall after slitting, thereby forming narrow passages 33 which are preferably of an approximate tangential nature extending substantially along the entire side wall of the tuyère. The tuyère also has an imperforate bottom 35 which is conveniently surrounded by an open solvent pan or container 36 to which liquid is fed through line 38.

The upper portion of the tuyère includes an imperforate portion 41 which terminates in a generally upwardly, downwardly and outwardly curved lip 42, the radius of which should be not less than ½ inch for a tuyère of 8" diameter.

Due to the angularity of the blades, a high velocity gas will set up a vortex within the tuyère having a low pressure center which will continuously carry the gases or vapors upward. It is found in addition that the highly moving vapors or gas passing over the liquid in the pan will entrain a very large amount of liquid. The path of the vapors is thus largely circular within the tuyère with a balance between the centrifugal outward tendency of the vortex and the inward flow of the gas or vapor.

By suitably proportioning the length and diameter of the tuyère it is possible to get the desired time and intimacy of contact of the gases and liquid so that a substantially uniform temperature of mix is obtained at the discharge end of the tuyère.

The imperforate portion 41 of the tuyère tends to coalesce the liquid which then flows over the lip to a quiescent hydrocarbon zone to be discharged outwardly and thence downwardly onto the deck 32. The vapors will move upwardly and outwardly away from the tuyère.

To establish the desired cooling of the gases in line 20 we drawn off from 15% to 25% of the filtrate from line 29 through line 37 and pass it to the pan 36 of tuyère 31.

The form of construction shown in tower 21 involves the use of multiple stages of vertical contacting; three stages are here shown. In this case the solvent in line 37 enters the tower 21 through the lines 38, 39 and 40 in parallel. The vapors to be cooled enter the lower part of the tower through the line 20 and pass upwardly through the tuyères in the three decks 32, 43 and 44 in series, each deck having a tuyère of the type shown at 31 in Fig. 2. The liquid discharge from each deck is returned through the lines 45, 46 and 47 to tank 18. The overhead gases discharge through line 16.

If desired, the liquid discharged onto the decks 32, 43, and 44 may be withdrawn into the lower part of the tower 21 where it may be accumulated before being passed to tank 18, or it may be passed to a separate accumulator.

There are unique technical advantages in contacting the vapors and solvent in an operation wherein the liquid enters the stages in parallel and the vapors pass in series through the successive stages as is shown in the drawing.

With a feed of 7,654 pounds per hour of gas at 100° F. it was possible to cool this to 5° F. by utilizing 34,500 pounds per hour of a pressed oil filtrate at −10° F. such filtrate being removed in part at 48° F. in line 45, in part at 25° F. in line 46, and the remainder at 5° in line 47. The amount of solvent removed at the three points is substantially the same. During this operation, the solvent absorbs about 200 pounds of water, etc., from the gas.

If the process is conducted in the manner described, very favorable operation is obtained accompanied by a substantial saving in the cost of the equipment. For a given operation it is found necessary to use a tuyère tower of perhaps one foot in diameter, fourteen feet high, and containing three tuyères. In comparison the packed tower designed to perform the same operation is three feet in diameter and thirty feet high and contains twenty feet of packing.

The high dispersion in the tuyère produces substantially equilibrium conditions (100% efficiency) as opposed to 50–75% efficiency in a packed tower. This means that a closer temperature approach can be obtained and therefore smaller amounts of liquid can be used for cooling. Furthermore, the use of the filtrate according to this invention makes possible the elimination of a separate cooling fluid, an external pump and cooler, and the accompanying refrigerating system.

When cooling to low temperatures in a packed tower, ice accumulates and interferes with operations. In the tuyère arrangement as shown in the drawing, there are no small openings in the contact zone wherein ice may accumulate; the relatively high velocity at the area of contact insures that any ice will be thrown out of the tuyère proper.

Aside from mechanical difficulties involved in the packed tower such as channelling and low efficiency, it is found that when a contacting operation such as hereinbefore described, is performed with a single liquid stream flowing countercurrent to a gas stream, the desired results cannot be obtained in practical manner. If a single stream operation is plotted for example, in terms of temperature versus heat content of the dry gas and the operating and equilibrium lines laid out in the usual manner, it is readily observable that due to the "pinch" near the saturation temperature of the gas (i. e. nearness of the operating and equilibrium lines) a large number of transfer units is needed. For the cited example 15 transfer units would be required for the "series" operation whereas only 3 are required for the "parallel" operation.

It is of course to be understood that various automatic or semiautomatic controls will be used in addition to those that are shown. A principal feature however of our invention is the establishing of a vortex within the tuyère, wherein the ascending gas may be directly contacted by liquid, and wherein said liquid is thereafter thrown out on discharge from the tuyère, with the substantially dry gas being returned to the filter operation. It is our experience that the minimum velocity of gas for such purpose should be at least about 30 feet per second but velocities up to 100 feet per second can be used without objectionable pressure drop. It will be noted that there are no narrow paths in which the water may freeze and clog, it being common practice to establish a width of blade opening of at least $\frac{3}{32}$".

It will be appreciated that another important feature of our invention is the continuity of operation as there is no revivification of apparatus necessary and each part of the unit operates at a substantially constant temperature which may be controlled to avoid heat loss. It will also be appreciated that the apparatus is simple, economical, and cheap to construct.

We claim:

1. In the process of separating wax from a chilled mixture of wax, oil, and solvent by filtration of said mixture in an atmosphere of chilled flue gas to produce a separated wax and a filtrate containing said flue gas, wherein said flue-gas is separated from said filtrate in a gas-liquid separating operation, and wherein make-up gas is introduced to said separated flue gas thereby forming a combined gas, the improved method of cooling and drying said combined gas in a multi-stage gas-liquid contacting operation which comprises forming in each of said stages a vertical path of said combined gas in a restricted zone in said stage, withdrawing liquid from said gas-liquid separating operation, dividing said liquid into a plurality of streams corresponding to said plurality of stages, directing each of said streams to the initial part of said vertical path in each of said stages, maintaining said liquid and said combined gas in said vertical path whereby said gas is cooled and dried, releasing said liquid from said gas upon discharge from said vertical path, withdrawing said dried and cooled gas from said vertical path, and passing said last-mentioned gas to subsequent stages wherein said gas is contacted with fresh feed in a manner similar to that in said first stage, said gas passing through said plurality of stages in series whereas said liquid passes therethrough in parallel, whereby said cooling operation is effected with a high efficiency and a low total pressure drop through said plurality of stages.

2. In the process of claim 1, the improvements claimed therein where said combined gas is cooled to below 32° F. thereby freezing out water contained therein.

3. In the process of separating wax from a chilled mixture of wax, oil, and solvent by filtration of said mixture in an atmosphere of chilled flue gas to produce a separated wax and a filtrate containing said flue gas, and wherein said flue gas is separated from said filtrate in a gas-liquid separating operation, the improved method of cooling and drying said separated gas in a multi-stage gas-liquid contacting operation which comprises concurrently forming in each of said stages a vertical path of said separated gas in a restricted zone in said stage, withdrawing liquid from said gas-liquid separating operation, dividing said liquid into a plurality of streams corresponding to said plurality of stages, directing each of said streams to the initial part of said vertical path in each of said stages, maintaining said liquid and said separated gas in said vertical path whereby said separated gas is cooled and dried, releasing said liquid from said separated gas upon discharge from said vertical path, withdrawing said dried and cooled gas from said vertical path, and passing said last-mentioned gas to subsequent stages wherein said gas is contacted with fresh feed in a manner similar to that in said first stage, said gas passing through said plurality of stages in series whereas said liquid passes therethrough in parallel, whereby said cooling operation is effected with a high efficiency and a low total pressure drop through said plurality of stages.

HYMAN R. DAVIS.
ROBERT M. SANTANIELLO.

REFERENCES CITED

The following references are of record in the file of this patent:

UNITED STATES PATENTS

| Number | Name | Date |
| --- | --- | --- |
| 971,297 | Miles | Sept. 27, 1910 |
| 1,724,513 | Pollitzer | Aug. 13, 1929 |
| 2,189,491 | Hawley | Feb. 6, 1940 |
| 2,511,190 | Wright | June 13, 1950 |